April 10, 1928.  B. B. PFEIFER  1,665,276
LICENSE PLATE LAMP
Filed Jan. 26, 1927   2 Sheets-Sheet 1
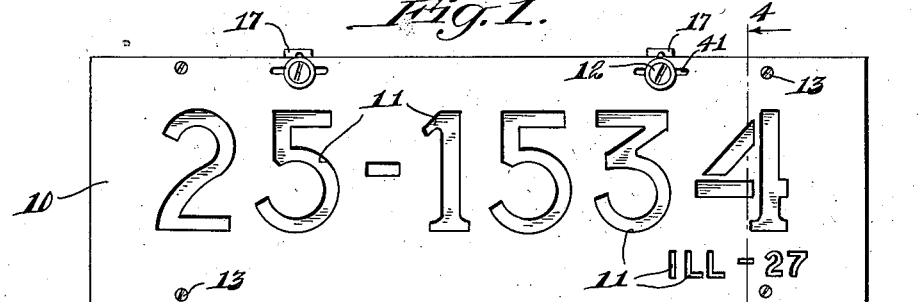
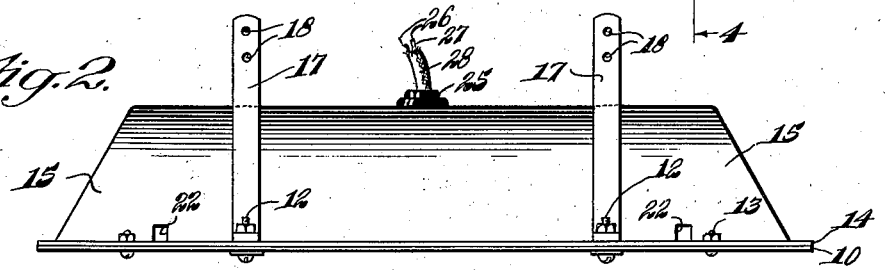
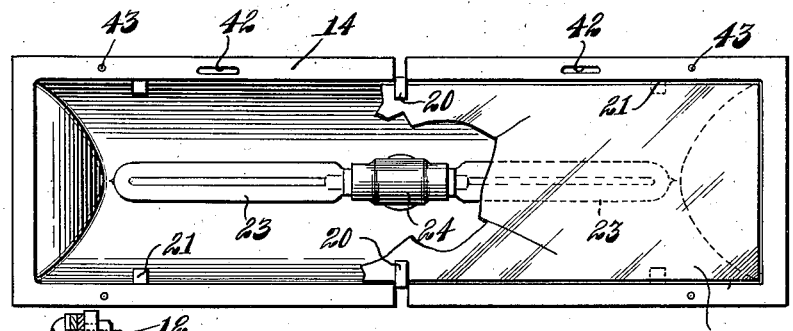
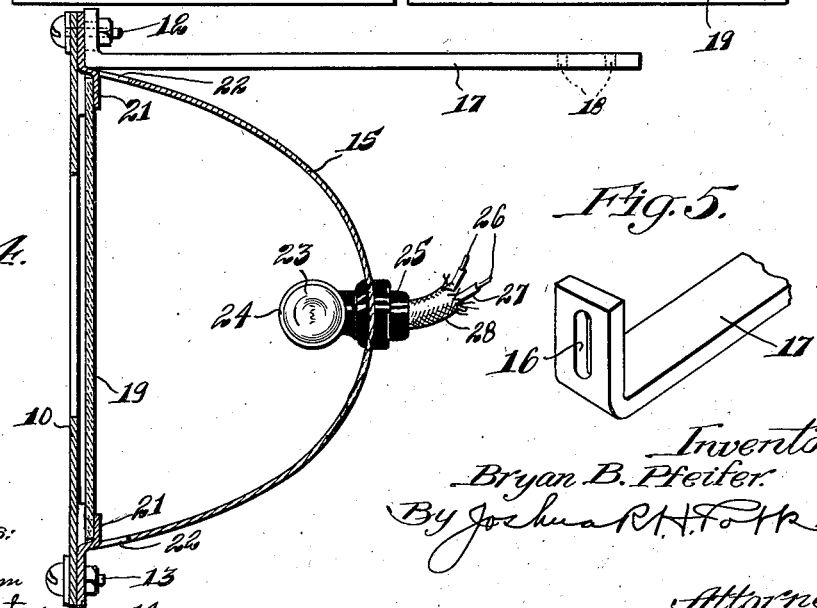
Inventor:
Bryan B. Pfeifer.
By Joshua R H Potts
Attorney April 10, 1928.  1,665,276
B. B. PFEIFER
LICENSE PLATE LAMP
Filed Jan. 26, 1927  2 Sheets-Sheet 2
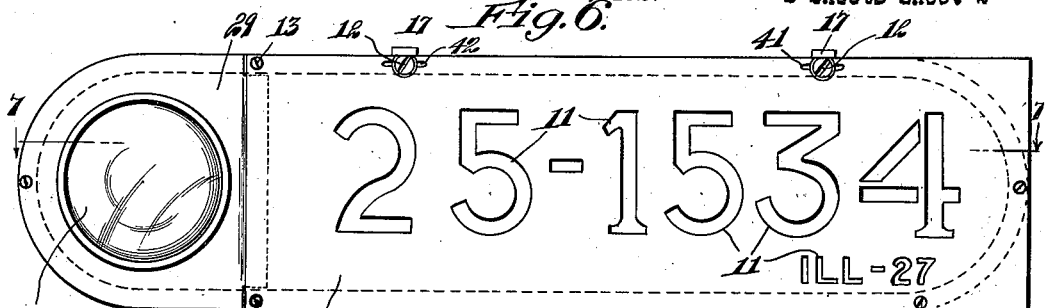
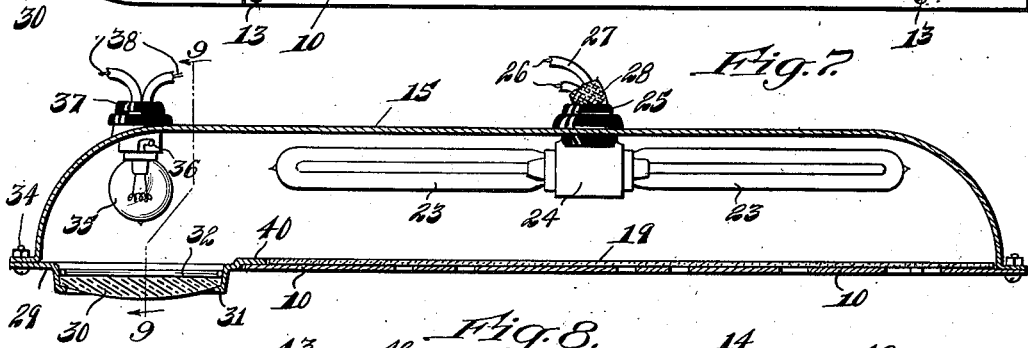
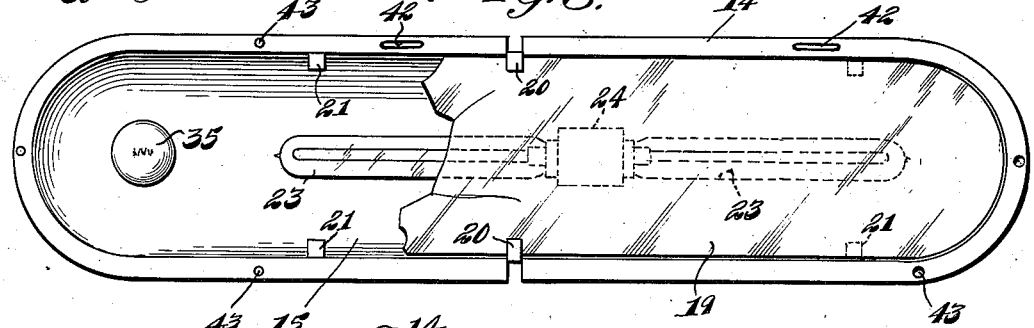
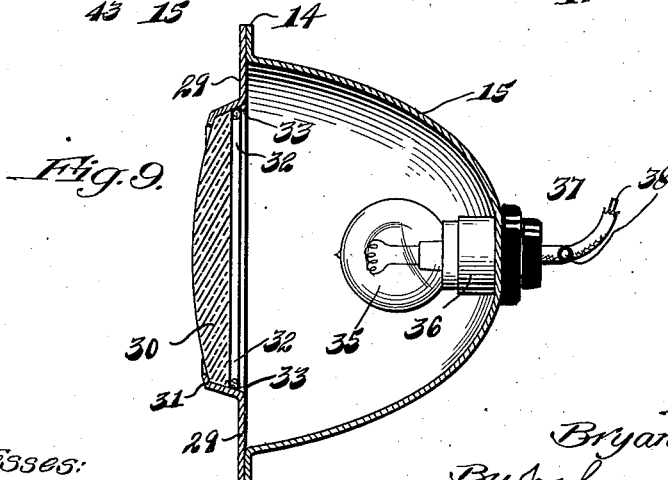
Inventor:
Bryan B. Pfeifer.
By Joshua R. H. Potts
his Attorney.
Witnesses:
D. F. Gathmann
F. C. Appleton Patented Apr. 10, 1928.

1,665,276

UNITED STATES PATENT OFFICE.

BRYAN B. PFEIFER, OF CHICAGO, ILLINOIS.

LICENSE-PLATE LAMP.

Application filed January 26, 1927. Serial No. 163,645.

My invention relates to a license plate lamp, and more particularly to a license plate lamp adapted for use on automobiles.

The object of my invention is to provide a license plate lamp of the above indicated character, having the figures and letters stencilled in the license plate and having a reflector behind said stencil plate and a source of light adapted to illuminate the figures on the plate.

Another object of my invention is to provide a lamp of the above indicated character, having an opalescent plate of glass or other suitable translucent material, mounted in the rear of a stencilled license plate to show up the figures of the plate in white during the daytime and in white light during the night time.

Another object of my invention is to provide a license plate lamp, having a source of light mounted in the same, and at the focus of an elongated paraboloid and adapted to supplement or substitute the source of light for a tail lamp, and having in combination therewith a source of light for the tail lamp adapted to supplement or substitute the source of light for the license plate lamp.

It is very desirable that automobile license plates should be plainly visible at night as well as in the daytime, and there have been no satisfactory means provided heretofore, whereby this could be accomplished economically and efficiently. By the use of my license plate lamp the numerals may be seen a great distance without blurring, and it is adaptable to the front as well as the rear of the car.

My invention will be best understood by reference to the accompanying drawings, forming a part of this specification, and in which:—

Figure 1 is an elevational plan view of a license plate lamp incorporating my invention.

Figure 2 is a top plan view of Figure 1.

Figure 3 is a front view of the lamp with the license plate removed, showing the inner side of the reflector and a portion of the glass normally mounted behind the license plate.

Figure 4 is an enlarged cross-sectional view taken on the line 4—4 of Figure 1.

Figure 5 is an enlarged perspective view of the mounting bracket for the lamp.

Figure 6 is an elevational plan view of a slight modification of my lamp, having combined therewith a tail lamp portion and adapted to be mounted on the rear of the automobile.

Figure 7 is a top cross-sectional view taken on approximately the line 7—7 of Figure 6.

Figure 8 is a front view similar to Figure 6 but having the license plate removed and a part of the glass broken away to show the inner side of the reflector.

Figure 9 is a cross-sectional view taken on approximately the line 9—9 of Figure 7.

In the drawings and for the purpose of illustration I have shown and preferred embodiment of my invention, and in which numeral 10 designates a license plate, having the figures and letters 11 stencilled therein instead of raised and painted in the conventional manner. The plate 10 is mounted by bolts 12 and 13 in contact with the flange 14 of the reflector member 15. The bolts 12 pass through slots 16 in the mounting brackets 17 for adjustably securing the lamp to the mounting brackets. The mounting brackets 17 are provided with holes 18 through which bolts or other suitable means may pass to secure the brackets to the automobile or car.

In the rear of the license plate 10 is suitably mounted a plate of opalescent glass or other suitable translucent material 19, and secured in place by lugs 20 punched out of the reflector flange 14, and similar lugs 21 punched out of the reflector proper, and providing ventilating holes 22 for the lamp in case other than the electric type is used. The opalescent glass as mounted provides white letters and figures for the license plate visible a great distance in the daytime and provides white illuminated figures and letters at night.

The reflector 15 is in the form of an elongated paraboloid, having a suitable source of light 23 mounted approximately at the focus of the paraboloid as shown, for efficiently directing rays of light through the opalescent glass and making visible the figures and letters on the license plate.

As shown in the drawings, I preferably use a plurality of elongated electric light bulbs 23, mounted in a double socket 24 and secured in position by the insulating bushing 25, in any suitable manner. Lead wires 26 extend from the light bulbs to any suitable source of power (not shown). The said wires are provided with insulation 27 and enclosed within a sheath 28 for protecting the wires from the weather.

In Figures 6 and 10 is shown a slightly modified form of my license plate lamp especially adapted to be used on the rear end of the car, in that, in addition to the features already described, I have provided a tail lamp portion combined with my license plate lamp. The tail lamp portion of my invention consists of a plate 29 mounted on one end of the reflector 15, and provided with a red lens 30 held in place by flange 31 and the expanding split rim member 32, which in turn is held in place by lug members 33 integral with the plate 29. Plate 29 is secured by a flange member 40 adapted to be inserted under the end of plate 10, and bolt 34 extending through the same and through the flange 14 of the reflector.

A source of light 35 is provided for the tail lamp end of my invention but it is obvious that in case it should be broken or otherwise rendered inoperative, the reflector will direct rays of light through the red lens from the bulbs 23 which are primarily intended for the license plate. It is also apparent that should the light bulbs 23 be inoperative the bulb 35 is so situated as to cause the light to be reflected from it through the openings 11 in the license plate. The several sources of light in the lamp are, therefore, adapted to substitute or supplement each other as may be required.

The bulb 35 is mounted in a socket 36 and secured in place by insulating bushing 37 in the usual manner. Wires 38 covered with insulation 39, lead from the bulb 35 to any suitable source of power.

The bulb 35 is easily accessible as the plate 29 may be removed by taking out the bolt 34 and withdrawing the flange 40 from under the end of the license plate.

Slots 41 in license plate 10 and slots 42 in the flange 14 are provided for the adjustment of the license plate on mounting the same in position, and after it is secured in the desired position by bolts 12, holes may be punched through the plate in places to register with holes 43 in the flange 14 through which the bolts 13 are passed and the plate 10 is thereby secured to the flange 14.

While I have described the preferred form of my invention it will be apparent that many modifications may be made therein without departing from the spirit of the invention, and I desire, therefore, not to be limited to the precise details as described but to avail myself of such variations and modifications as come within the scope of the appended claims.

I claim as my invention:

1. The combination of a license plate lamp, the inside thereof forming an elongated parabolic reflector, a stenciled license plate mounted thereon; a sheet of opalescent glass mounted behind said stenciled plate; a source of light mounted in said lamp at the focus of said reflector for reflecting light through said glass and the openings in said plate; a flange on said lamp having a portion thereof punched out and bent back to hold backwardly on said glass; portions punched out of said reflector and bent down to hold forwardly on said glass; means for securing said license plate to said flange; a lens plate mounted at one end of said reflector and having a lens therein; a source of light mounted behind said lens; means for securing one end of said lens plate to said flange; means on the other end of said lens plate engaging under said license plate for securing said lens plate in position.

2. The combination of a license plate lamp having a flange thereon; the inside of said lamp forming an elongated parabolic reflector with an elongated focus; a stenciled license plate mounted on said flange; a lens plate mounted on said flange at one end of said license plate and having a lens mounted therein; a sheet of opalescent glass mounted behind said stenciled plate; an elongated source of light mounted in said elongated focus for effecting an equal distribution of light through the openings in said stenciled plate and through said lens; a portion of said flange being punched out and bent back to hold backwardly on said glass; a portion punched out of said reflector and bent down to hold forwardly on said glass; means for securing said license plate to said flange; means for securing one end of said lens plate to said flange; means on the other end of said lens plate engaging under said license plate for securing said lens plate in position.

3. The combination of a license plate lamp having a flange thereon; the inside of said lamp forming an elongated parabolic reflector with an elongated focus; a stenciled license plate mounted on said flange; a lens plate mounted on said flange at one end of said license plate and having a lens mounted therein; a sheet of opalescent glass mounted behind said stenciled plate; an elongated source of light mounted in said elongated focus for effecting an equal distribution of light through the openings in said stenciled plate and through said lens; a portion of said flange being punched out and bent back to hold backwardly on said glass; a portion punched out of said reflector and bent down to hold forwardly on said glass; means for securing said license plate to said flange; means for securing one end of said lens plate to said flange; means on the other end of said lens plate engaging under said license plate for securing said lens plate in position; a source of light positioned behind said lens and at one end of said elongated focus for passing light through said lens and effecting a substantially equal distribution of light through the openings in said stenciled plate.

In testimony whereof I have signed my name to this specification.

BRYAN B. PFEIFER.